Dec. 15, 1936.    H. LEDWINKA    2,064,380
MOTOR VEHICLE BODY
Filed Oct. 14, 1935    2 Sheets-Sheet 1

Inventor
HANS LEDWINKA
By B. Singer
Attorney

Dec. 15, 1936.  H. LEDWINKA  2,064,380

MOTOR VEHICLE BODY

Filed Oct. 14, 1935  2 Sheets-Sheet 2

Inventor:
Hans Ledwinka
By B. Singer
Attorney

Patented Dec. 15, 1936

2,064,380

UNITED STATES PATENT OFFICE 2,064,380

MOTOR VEHICLE BODY

Hans Ledwinka, Koprivnice, Czechoslovakia

Application October 14, 1935, Serial No. 44.861
In France October 15, 1934

6 Claims. (Cl. 180—54)

In stream-line vehicles having a rear engine which is more particularly air-cooled, it is difficult to construct and arrange the inlet apertures for the cooling air so that a sufficient quantity of cooling air can be supplied to the engine without increasing the air resistance and detracting from the appearance of the vehicle. Thus for example, in a known construction the main inlet apertures for the cooling air are disposed directly in the upper wall of the vehicle body and are provided with upwardly opening hinged flaps adjustable relatively to the direction of the air-flow during traveling. An intense cooling is certainly secured by means of this arrangement but the flaps projecting from the upper wall of the body interfere with the stream-line form and produce eddying of the air at the rear of the vehicle. In addition, they detract from the good appearance of the vehicle.

The disadvantages of the known arrangements are eliminated according to the invention by the fact that the inlet apertures for the cooling air are arranged within the general contour of the stream-line walls of the body and substantially at right-angles thereto.

The part of the wall situated, in the direction of travel, in front of an air inlet aperture arranged at right-angles to the wall of the vehicle body is offset relatively to the adjacent stream-lined wall sections and is itself stream-lined in such a manner that the said part leads to the inner edge of the air inlet aperture, and preferably an extension of the said wall part beyond the aperture may form a part of the inner wall of the air guiding passage.

A further feature of the invention is that the air inlet apertures formed in the manner indicated are provided on the upper wall of the vehicle body or on the edges formed by the upper wall and the side walls. With this construction, a middle section of the vehicle body upper wall terminating at the partition separating the engine compartment from the interior of the vehicle is conveniently left unaltered according to the general stream-line contour of the vehicle body, the said middle part being preferably provided with the rear window, while the roof gradually falls inwardly from the front to the rear on both sides of the middle section.

The part of the upper wall covering the engine compartment and adapted to be raised is shaped in accordance with the general stream-line contour and preferably extends to the front edge of the air inlet aperture, so that when the cover is closed, forwardly open passages are formed between the cover and the inwardly offset surfaces of the wall of the vehicle body. During travelling, the cooling air enters the engine compartment through the said passages and escapes again in any desired manner, for example through the louvers of the cover.

The difficulties arising with regard to the rearward visibility are eliminated according to the invention by the fact that the air outlet louvers behind the window which is provided in the partition separating the engine compartment from the interior of the vehicle are arranged substantially on a level with the said window so that the occupants of the vehicle can see through the suitably shaped slits of the louvers.

The invention is illustrated diagrammatically by way of example in the accompanying drawings, wherein.

Figure 1:
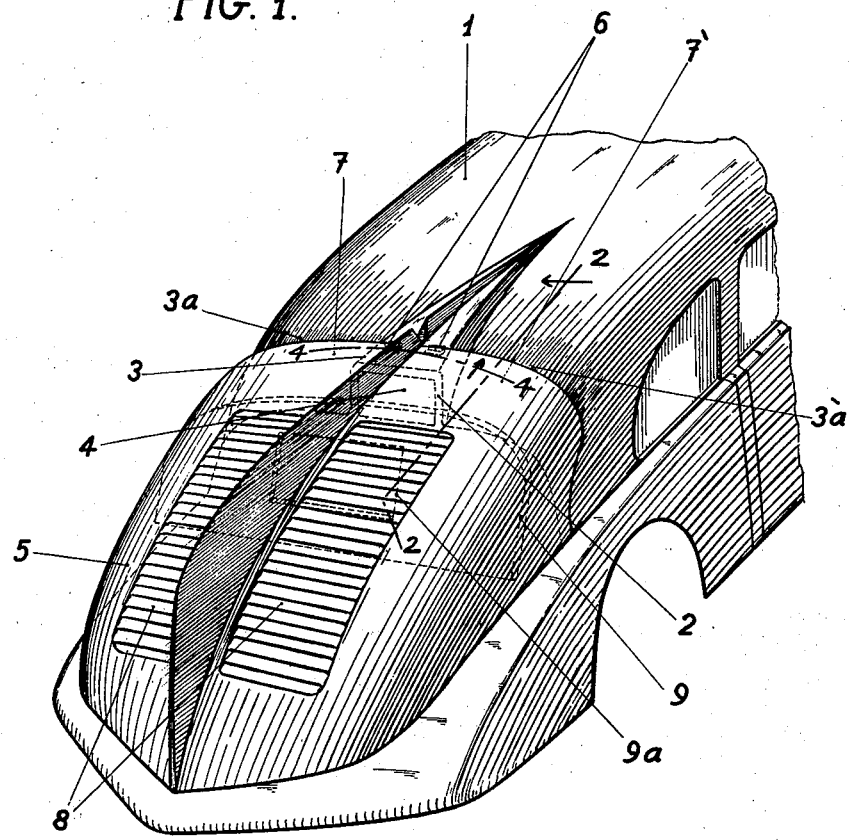
Figure 1 is a perspective view of the rear portion of a vehicle body constructed according to a form of the invention.
Figure 4:
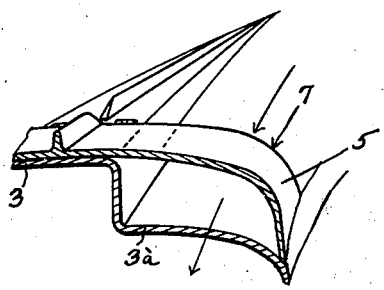
Figure 4 is a detail sectional perspective view on the line 4—4 of Figure 1.
Figure 2:
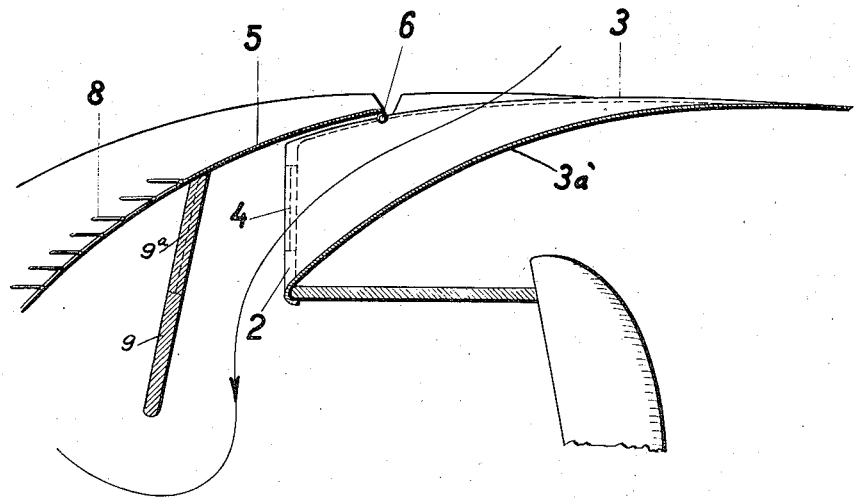
Figure 2 shows a longitudinal section on substantially the line 2—2 of Figure 1 through the rear portion of the vehicle body shown in Figure 1.

In the form of construction according to Figures 1 and 2, the roof of the vehicle body is constructed only in its middle part 3 according to the general stream-line contour as far as the rear partition 2 separating the interior of the vehicle from the engine compartment. The roof sections 3a and 3a' situated on either side of this middle part are gradually depressed rearwardly and towards the interior of the vehicle, so that the middle part 3 forms as it were a kind of dormer. The rear end of this elevated part 3 is provided with one or more windows 4. The cover 5, which is adapted to be raised is shaped in accordance with the general stream-line contour of the vehicle walls and is pivotally connected to the fixed vehicle body by means of hinges 6, preferably on the middle elevated part 3. The cover extends over the rear part of the fixed vehicle body constructed in the manner indicated, and over the engine compartment.

Due to the specified construction and arrangement, two air passages with the apertures 7 and 7' at right-angles to the wall of the vehicle body and facing the direction of travel are formed between the front lateral sections of the cover 5 and the depressed roof surfaces 3a and 3a'. As indicated by the arrows, the air passes through the said apertures 7, 7' and is led by means of the guiding partition 9 through the passages to enter the engine compartment, and flows out again into the open through the louvers 8 formed in the cover 5. At the same time, the louvers 8 render it possible to see out towards the rear through the window 9a in partition 9 and through the window 4 arranged in the rear wall 2 of the dormer 3 from the interior of the vehicle.

Figure 3:
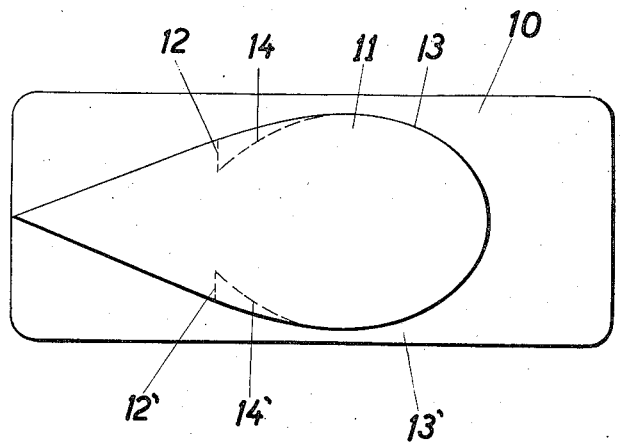
Figure 3 shows the rear portion of a vehicle body with a second form of construction of the invention.

In the form of construction of the invention shown in Figure 3, the vehicle body comprises in known manner a lower part 10 shaped like a portion of an aircraft supporting wing, having a lower wall parallel to the road surface, and an upper part 11 having a stream-line shape in plan. The air inlet apertures 12, 12' arranged at right-angles to the direction of travel are now formed in the lateral walls 13, 13' of the upper part 11. The wall sections 14, 14' situated in front of the apertures 12, 12' are again inclined gradually to the rear and to the interior of the vehicle.

Of course, the invention is not limited to the constructional examples illustrated but numerous modifications are possible or may even be necessary in accordance with the particular configuration of the vehicle body.

I claim:

1. In a streamline motor vehicle having a rear engine, means to lead cooling air to and from the engine, such means comprising the provision of air inlets arranged within the general contour of the streamlined walls, one at either side of a central dormer-like wall defining within itself a passage communicating with the interior of the vehicle body and having a rear window, a streamline hood at the rear of the body into the front of which said air inlets deliver the cooling air, said hood having air outlet louvers arranged to the rear of said window through which and through said window persons within the vehicle can see to the rear.

2. In a streamline motor vehicle having a rear engine, means to lead cooling air to and from the engine, such means comprising the provision of air inlets arranged within the general contour of the streamlined walls, one at either side of a central dormer-like wall defining within itself a passage communicating with the interior of the vehicle body and having a rear window, a streamline hood at the rear of the body into the front of which said air inlets deliver the cooling air, said hood having air outlet louvers arranged to the rear of said window through which and through said window persons within the vehicle can see to the rear, and a baffle-partition between said air inlets and said louvers and itself having a rear-view window.

3. In a streamline motor vehicle having a compartment at the rear for an engine, a streamline hood over said compartment, the body of said vehicle adjacent the front end of said hood being depressed at either side to provide a center dormer-like portion, and two air inlets arranged within the general contour of the streamlined walls of the vehicle body and substantially at right-angles thereto, said hood having air outlet louvers located to the rear of said air inlets and said dormer-like portion, through which louvers and dormer-like portion persons within the vehicle body may have rear vision.

4. In a streamline motor vehicle having a compartment at the rear for an engine, a streamline hood over said compartment, the body of said vehicle adjacent the front end of said hood being depressed at either side to provide a center dormer-like portion, two air inlets arranged within the general contour of the streamlined walls of the vehicle body and substantially at right-angles thereto, said hood having air outlet louvers located to the rear of said air inlets and said dormer-like portion, through which louvers and dormer-like portion persons within the vehicle body may have rear vision, and a transverse partition beneath the hood between the louvers and said air inlets and said dormer-like portion of the body, said partition having a window lining up with said dormer-like portion for rear vision purposes, said partition serving to deflect incoming air downwardly in the engine compartment of the vehicle.

5. In a streamline motor vehicle having a compartment at the rear for an engine, a streamline hood over said compartment, the body of said vehicle adjacent the front end of said hood being depressed at either side to provide a center dormer-like portion, and two air inlets arranged within the general contour of the streamlined walls of the vehicle body and substantially at right-angles thereto, said hood having air outlet louvers located to the rear of said air inlets and said dormer-like portion, through which louvers and dormer-like portion persons within the vehicle body may have rear vision, said hood being shaped in accordance with the general streamline contour and extending forwardly over the rear end of said dormer-like portion, so that when the hood is closed down as a cover forwardly opening passages are formed between said hood and the depressed portions of the body adjacent thereto, the cooling air flowing into the engine compartment through said passages.

6. In a streamline motor vehicle having a compartment at the rear for an engine, a streamline hood over said compartment, the body of said vehicle adjacent the front end of said hood being depressed at either side to provide a center dormer-like portion, two air inlets arranged within the general contour of the streamlined walls of the vehicle body and substantially at right-angles thereto, said hood having air outlet louvers located to the rear of said air inlets and said dormer-like portion, through which louvers and dormer-like portion persons within the vehicle body may have rear vision, said hood being shaped in accordance with the general streamline contour and extending forwardly over the rear end of said dormer-like portion, so that when the hood is closed down as a cover forwardly opening passages are formed between said hood and the depressed portions of the body adjacent thereto, the cooling air flowing into the engine compartment through said passages, and a transverse partition beneath the hood between the louvers and said air inlets and said dormer-like portion of the body, said partition having a window lining up with said dormer-like portion for rear vision purposes, said partition serving to deflect incoming air downwardly in the engine compartment of the vehicle.

HANS LEDWINKA.